June 9, 1925.

H. W. HOWE

TRUCK FOR TRANSPORTING GOODS

Filed March 26, 1924

Inventor.
Harold W. Howe
By
Sturtevant & Mason
Attorneys

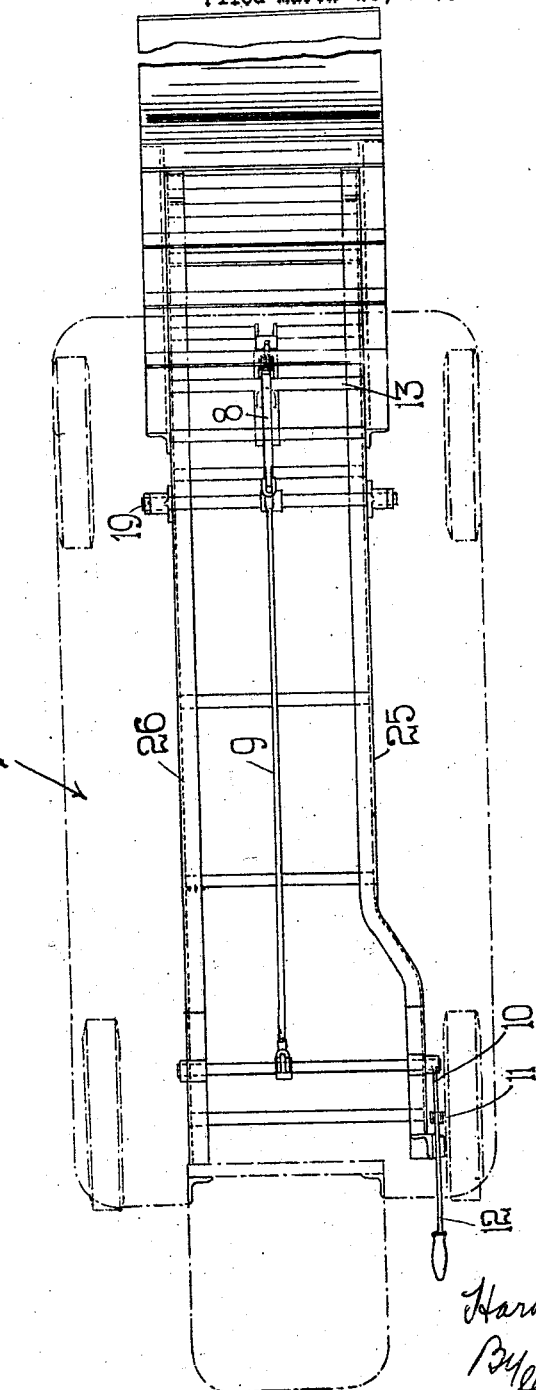

Patented June 9, 1925.

1,541,570

UNITED STATES PATENT OFFICE.

HAROLD WALTON HOWE, OF LIVERPOOL, ENGLAND.

TRUCK FOR TRANSPORTING GOODS.

Application filed March 26, 1924. Serial No. 702,100.

*To all whom it may concern:*

Be it known that I, HAROLD WALTON HOWE, a subject of the King of Great Britain, residing in Liverpool, in the county of Lancaster and Kingdom of England, have invented certain new and useful Improvements in Trucks for Transporting Goods, of which the following is a specification.

This invention relates to trucks for transporting goods, and more particularly refers to mechanically propelled trucks, such, for instance, as electric trucks, that are commonly used on dock quays, in factories, railway stations, and other places.

The object of the invention is to provide means to facilitate the use of such trucks in connection with heavy bales or packages which have to be weighed. Thus, for example, at the Liverpool docks, cotton bales on their discharge from a steamer have to be trucked to a weighing-scale and weighed, before being further transported. The lifting of heavy bales of cotton from a horizontal position on the truck-platform on to the scale, and then back again to the truck after the weighing, entails much heavy manual labour, and increases the cost of handling discharged cargo.

According to this invention an auxiliary platform is pivotally mounted with its supporting base positioned in close proximity to the ground in its carrying position and is adapted to pivot so that the base comes into substantial alignment with the ground.

The auxiliary platform is adapted to carry the bale or the like in an upright position, that is, on end, and when the truck is run up to the scale, the auxiliary platform projects more or less over the scale. The bale can then be tipped off the auxiliary platform onto the scale platform, and after the weighing operation, the bale is tipped back on to the auxiliary platform. In this way the heavy labour of raising the bale from a horizontal to the upright position on the ordinary truck platform, and then lifting it on to the scale, and then back again, as is the present practice, is avoided.

The invention is more particularly described with reference to the accompanying drawings, in which:—

Figure 2 is a plan view.

Figure 1:
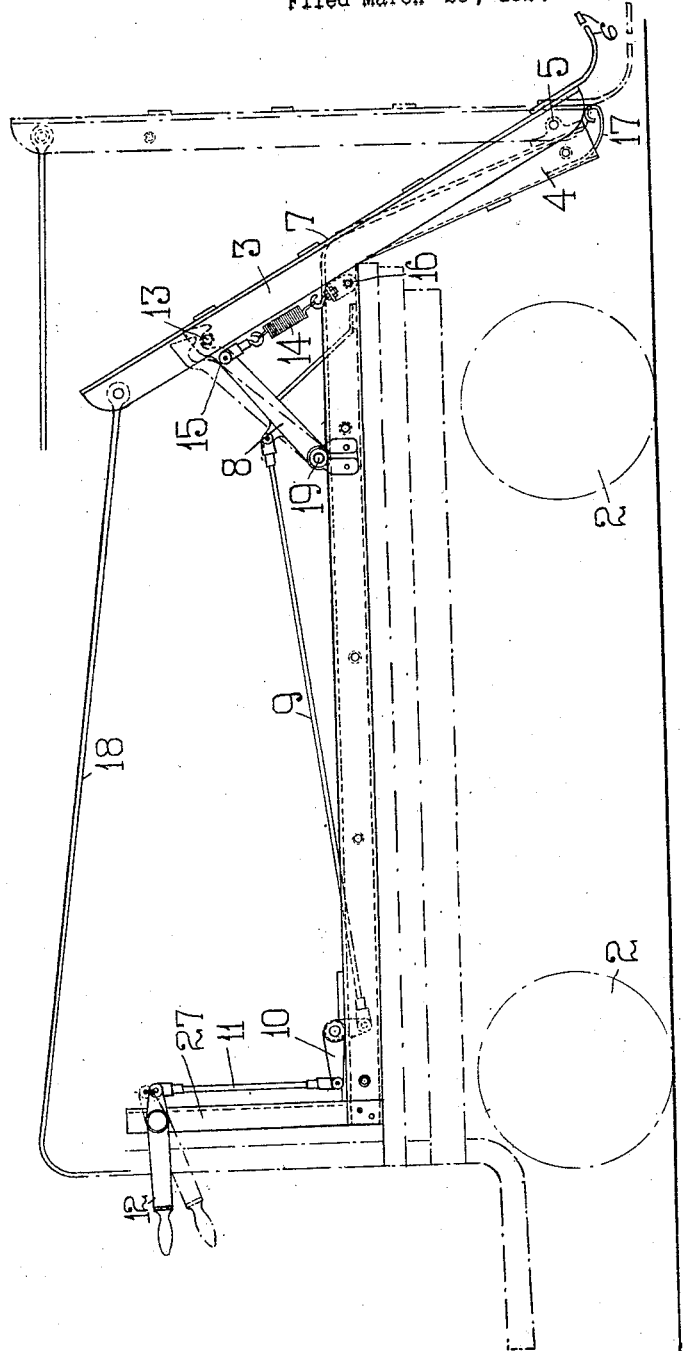
Figure 1 is a side elevation of a truck with the device of the present invention attached thereto.

Referring to the drawings, a mechanically propelled truck 1 having the usual wheels 2 is provided at one end with an auxiliary platform 3. This auxiliary platform is pivoted to a depending member 4 positioned on the truck 1, at the point 5, and is preferably formed of a leading platform 6 extending at right angles to the main portion 7 of the auxiliary platform.

The platform 3 is held in the position shown in full lines in Figure 1 by a spring controlled hook 8 connected by a link 9, cranked lever 10 and rod 11 to an operating lever 12. The forward end of the hook 8 is adapted to engage over a bar 13 mounted transversely of the platform 3. The hook 8 is maintained in engagement with the bar 13 by means of a spring 14 pivotally connected at 15 to the hook 8 and also pivotally connected to the longitudinal members 26 as shown at 16.

Mounted at the bottom of the depending portion 4 is a spring 17 against which the bottom of the platform 3 is adapted to bear.

The platform 3 is preferably of less width than the truck 1, as shown in Fig. 2 in order that there may be a certain amount of overhang of the goods transported thereon.

The method of operation of the device is as follows:—

When carrying a load the platform is tipped back into the position shown in full in Fig. 1 with the result that the hook 8 engages with the bar 13 and holds the platform in this position, the hook being maintained in engagement by the spring 14. When it is desired to release the load, for example, on to the platform of a weighing machine, the hook 8 is released from its engagement with the bar 13 by means of pressure on the lever 12 with the result that under the action of the load the platform 3 tilts about its pivotal axis 5 into the position shown dotted in Fig. 1. In this manner the loading platform 6 is brought into close proximity to the ground or scale platform and the load can be easily moved therefrom.

When the load is taken off the loading platform 6 the spring 17 tilts the platform 3 into its normal position for loading, where the hook 8 may again engage the bar 13 thus giving ground clearance to allow free movement of the truck.

A stay, rope or the like 18 of suitable strength is attached to the upper portion of the platform 3 to assist in tilting the platform into the carrying position when the same is loaded or unloaded.

In order that the truck may be used without the platform the various members of the platform are arranged to be mounted on longitudinal members 26 and 4 or upright 27, which longitudinal members are secured by any easily removable means such as bolts to the platform of the truck.

I declare that what I claim is:—

1. In a loading truck the combination of a load supporting platform, frame members detachably connected to said platform and depending to a point immediately adjacent the ground, an auxiliary platform comprising a loading base and a supporting member extending at right angles to said base, a pivotal support for said auxiliary platform mounted at the lowest point of said depending portion of said frame member and means for attaching said auxiliary platform to said pivotal support located at a point on the auxiliary platform substantially adjacent the connection of said base and said supporting member, whereby said auxiliary platform may tilt from load carrying position in close proximity to the ground into a position in substantial alignment with the ground.

2. In a loading truck the combination of a load supporting platform having a depending portion extending to a point in close proximity to the ground, an auxiliary platform comprising a loading base and a supporting member and extending at right angles to said base, a pivotal support for said auxiliary platform mounted at the lowest point of said depending portion of said load supporting platform, means for attaching said auxiliary platform to said pivotal support located at a point on said auxiliary platform substantially adjacent the connection of said base and said supporting member and means located at the end of said supporting member remote from said pivotal mounting to tilt said auxiliary platform about said pivotal support.

3. In a loading truck the combination of a load supporting platform having a depending portion extending to a point in close proximity to the ground, an auxiliary platform comprising a loading base and a supporting member and extending at right angles to said base, a pivotal support for said auxiliary platform mounted at the lowest point of said depending portion of said load supporting platform, means for attaching said auxiliary platform to said pivotal support located at a point on said auxiliary platform substantially adjacent the connection of said base and said supporting member, means located at the end of said supporting member remote from said pivotal mounting to tilt said auxiliary platform about said pivotal support and means to hold said auxiliary platform in a tilted position relatively to the ground but in close proximity thereto.

4. In a loading truck the combination of a load supporting platform having a depending portion extending to a point in close proximity to the ground, an auxiliary platform comprising a loading base and a supporting member and extending at right angles to said base, a pivotal support for said auxiliary platform mounted at the lowest point of said depending portion of said load supporting platform, means for attaching said auxiliary platform to said pivotal support located at a point on said auxiliary platform substantially adjacent the connection of said base and said supporting member, means located at the end of said supporting member remote from said pivotal mounting to tilt said auxiliary platform about said pivotal support, means to hold said auxiliary platform in a tilted position relatively to the ground but in close proximity thereto and means to release said holding means whereby the said auxiliary platform pivots to bring said loading base into substantial alignment with the ground.

5. In a loading truck the combination of a main loading platform, an auxiliary platform comprising a loading base and a supporting member extending at right angles to said base, means to connect said supporting member pivotally to said main platform, means to hold said auxiliary platform in a tilted position relatively to the ground, means to release said holding means whereby the auxiliary platform pivots to bring said loading base in substantial alignment with the ground and spring means resisting the movement of said auxiliary platform from said tilted position.

6. In a loading truck the combination of a main loading platform, an auxiliary platform pivotally mounted on said main platform and comprising a loading base and a supporting member extending at right angles thereto, a transverse bar mounted on said supporting member, a hook pivotally mounted on said main platform and adapted to engage said bar, spring means mounted on said main platform to hold said hook in engagement, and means to release said hook from said bar in order to allow said auxiliary platform to pivot.

7. In a loading truck the combination of a main loading platform, an auxiliary platform pivotally mounted on said main platform, and comprising a loading base and a supporting member extending at an angle thereto, a transverse bar mounted on said supporting member, a hook pivotally mounted on said main platform and adapted to engage said bar, spring means mounted on said main platform to hold said hook in engagement and hand operated means to release said hook from said bar in order to allow said auxiliary platform to pivot.

In witness whereof, I have hereunto signed my name this 14th day of March 1924, in the presence of two subscribing witnesses.

HAROLD WALTON HOWE.

Witnesses:
 FRANK WATSON,
 CHARLES JONES.